United States Patent
Hatanaka (10) Patent No.: US 12,488,895 B2
(45) Date of Patent: Dec. 2, 2025

(54) ELECTROCARDIOGRAM ANALYSIS SYSTEM

(71) Applicant: Tetsuo Hatanaka, Kitakyusyu (JP)

(72) Inventor: Tetsuo Hatanaka, Kitakyusyu (JP)

( * ) Notice: Subject to any disclaimer, the term of this patent is extended or adjusted under 35 U.S.C. 154(b) by 394 days.

(21) Appl. No.: 17/759,543

(22) PCT Filed: Feb. 4, 2021

(86) PCT No.: PCT/JP2021/004114
§ 371 (c)(1),
(2) Date: Jul. 27, 2022

(87) PCT Pub. No.: WO2021/153801
PCT Pub. Date: Aug. 5, 2021

(65) Prior Publication Data
US 2023/0089350 A1 Mar. 23, 2023

(30) Foreign Application Priority Data
Jan. 31, 2020 (JP) .................................. 2020-015346

(51) Int. Cl.
*A61B 5/00* (2006.01)
*A61B 5/053* (2021.01)
(Continued)

(52) U.S. Cl.
CPC ............. *G16H 50/20* (2018.01); *A61B 5/053* (2013.01); *A61B 5/308* (2021.01); *A61B 5/346* (2021.01); *G16H 15/00* (2018.01); *G16H 50/70* (2018.01)

(58) Field of Classification Search
None
See application file for complete search history.

(56) References Cited

U.S. PATENT DOCUMENTS

| 2013/0197380 A1 | 8/2013 | Oral et al. |
| 2014/0277225 A1* | 9/2014 | Quan ............... A61N 1/3987 607/6 |
| 2017/0007842 A1* | 1/2017 | Amann ............ A61N 1/39044 |

FOREIGN PATENT DOCUMENTS

| JP | H08-322952 A | 12/1996 |
| JP | 2003-204947 A | 7/2003 |

(Continued)

OTHER PUBLICATIONS

International Search Report issued in Patent Application No. PCT/JP2021/004114 dated Apr. 27, 2021.

(Continued)

*Primary Examiner* — Sana Sahand
(74) *Attorney, Agent, or Firm* — MCDONALD HOPKINS LLC (57) ABSTRACT

To provide an electrocardiogram analysis system capable of determining the need for an electric shock to a patient undergoing cardiopulmonary resuscitation (CPR) with a higher accuracy. An electrocardiogram analysis system includes electrocardiogram (ECG) signal acquiring means 11, ECG signal sampling means 12, ECG spectrogram transforming means 13, impedance signal acquiring means 21, impedance signal sampling means 22, impedance spectrogram transforming means 23, a convolutional neural network (CNN) 4 including an input layer 4I, an output layer 4O, sample data accumulation means 4L, and sample data input means 4T, and electric shock indication reporting means 5. The CNN is a priori provided with sample data including sample ECG spectrograms and sample impedance spectrograms obtained from a large number of subjects, and sample response data on the need for an electric shock, and is optimized by self-learning the sample data.

2 Claims, 5 Drawing Sheets

(51) Int. Cl.
  *A61B 5/308* (2021.01)
  *A61B 5/346* (2021.01)
  *G16H 15/00* (2018.01)
  *G16H 50/20* (2018.01)
  *G16H 50/70* (2018.01)

(56) References Cited

FOREIGN PATENT DOCUMENTS

| | | |
|---|---|---|
| JP | 2014-124345 A | 7/2014 |
| JP | 2017-525410 A | 9/2017 |
| JP | 2018-500092 A | 1/2018 |

OTHER PUBLICATIONS

Yong Xia et al., "Detecting atrial fibrillation by deep convolutional neural networks", Computers in Biology and Medicine, Feb. 1, 2018, vol. 93, pp. 84-92.

Tetsuo Hatanaka et al., "A Convolutional Neural Network for Real-time Discrimination of Shock-indicated Rhythms during CPR", AHA Journals https://www.ahajournals.org/doi/10.1161/circ.138.suppl_2.268, Nov. 5, 2018.

* cited by examiner

| FREQUENCY (Hz) | IMPEDANCE SPECTROGRAM (SIGNAL STRENGTH) | | | | | | | | | | | | | | | | | |
|---|---|---|---|---|---|---|---|---|---|---|---|---|---|---|---|---|---|---|
| 30.76-31.25 | 0.3 | 0.4 | 0.5 | 0.5 | 0.5 | 0.4 | 0.3 | 0.3 | 0.3 | 0.4 | 0.6 | 0.9 | 0.9 | 0.8 | 0.6 | 0.5 | 0.5 | 0.6 |
| 30.27-30.76 | 0.3 | 0.3 | 0.3 | 0.3 | 0.4 | 0.4 | 0.3 | 0.2 | 0.2 | 0.3 | 0.4 | 0.6 | 0.7 | 0.7 | 0.6 | 0.5 | 0.5 | 0.7 |
| 29.79-30.27 | 0.2 | 0.1 | 0.1 | 0.2 | 0.3 | 0.5 | 0.6 | 0.7 | 0.6 | 0.5 | 0.4 | 0.7 | 1.0 | 1.1 | 1.2 | 1.2 | 1.1 | 1.0 |
| 29.30-29.79 | 0.1 | 0.2 | 0.3 | 0.4 | 0.5 | 0.7 | 0.9 | 1.1 | 1.2 | 1.4 | 1.5 | 1.5 | 1.4 | 1.2 | 0.9 | 0.8 | 0.9 | 0.9 |
| 28.81-29.30 | 0.1 | 0.2 | 0.3 | 0.4 | 0.4 | 0.3 | 0.5 | 0.9 | 1.3 | 1.7 | 2.0 | 1.9 | 1.6 | 1.2 | 0.8 | 0.6 | 0.8 | 1.0 |
| 28.32-28.81 | 0.5 | 0.6 | 0.7 | 0.7 | 0.7 | 0.7 | 0.9 | 1.2 | 1.6 | 2.0 | 2.0 | 1.4 | 1.0 | 1.0 | 1.3 | 1.6 | 1.7 | 1.7 |
| 4.39-4.88 | 0.5 | 0.1 | 0.7 | 1.2 | 1.6 | 1.7 | 1.8 | 1.8 | 2.0 | 2.0 | 2.0 | 1.5 | 1.2 | 1.0 | 1.0 | 1.1 | 1.4 | 1.5 |
| 3.91-4.39 | 1.4 | 1.6 | 1.8 | 1.9 | 1.9 | 1.5 | 0.9 | 0.6 | 1.6 | 2.6 | 3.2 | 2.8 | 2.0 | 1.4 | 1.6 | 2.1 | 2.3 | 2.2 |
| 3.42-3.91 | 1.9 | 2.0 | 2.0 | 1.9 | 1.9 | 2.2 | 2.7 | 3.4 | 4.3 | 5.3 | 6.2 | 6.6 | 6.4 | 6.0 | 5.6 | 5.1 | 4.4 | 3.5 |
| 2.93-3.42 | 0.6 | 1.9 | 2.6 | 2.8 | 2.2 | 2.2 | 3.8 | 6.0 | 7.8 | 8.7 | 8.6 | 6.5 | 5.9 | 6.3 | 6.9 | 7.1 | 6.6 | 5.5 |
| 2.44-2.93 | 7.1 | 7.5 | 8.1 | 8.6 | 9.1 | 9.9 | 10.8 | 11.8 | 12.5 | 12.3 | 10.9 | 5.2 | 4.1 | 6.0 | 7.9 | 8.5 | 7.8 | 6.3 |
| 1.95-2.44 | 10.5 | 11.1 | 11.5 | 11.5 | 10.9 | 10.0 | 9.0 | 9.0 | 10.4 | 12.3 | 13.6 | 13.7 | 12.9 | 12.0 | 10.9 | 9.6 | 7.9 | 5.9 |
| 1.46-1.95 | 6.3 | 6.1 | 6.3 | 7.0 | 7.2 | 6.3 | 4.3 | 3.1 | 6.1 | 10.2 | 13.3 | 13.8 | 11.3 | 8.1 | 6.0 | 6.0 | 6.6 | 6.4 |
| 0.98-1.46 | 3.5 | 2.3 | 2.3 | 3.7 | 5.8 | 6.5 | 7.1 | 8.8 | 10.4 | 12.7 | 13.7 | 12.6 | 10.7 | 8.1 | 6.3 | 6.5 | 8.1 | 8.6 |
| 0.49-0.98 | 5.0 | 6.4 | 5.6 | 4.8 | 5.3 | 4.4 | 4.3 | 5.8 | 6.9 | 10.2 | 10.2 | 9.8 | 10.0 | 11.0 | 12.0 | 11.9 | 11.3 | 9.6 |
| 0.00-0.49 | 4.5 | 7.1 | 5.1 | 0.6 | 1.8 | 1.7 | 1.0 | 0.3 | 3.3 | 7.6 | 7.1 | 3.5 | 1.8 | 7.9 | 11.1 | 11.5 | 11.0 | 6.2 |
| TIME (ms) | 0 | 128 | 256 | 384 | 512 | 640 | 768 | 896 | 1024 | 1152 | 1280 | 9344 | 9472 | 9600 | 9728 | 9856 | 9984 | 10112 |

ELECTROCARDIOGRAM ANALYSIS SYSTEM

FIELD

The present invention relates to an electrocardiogram analysis system that processes information obtained from a body surface electrocardiogram (ECG) acquired by an automated external defibrillator (AED: automated external defibrillator), a defibrillator, or an electrocardiograph, for a patient undergoing cardiopulmonary resuscitation (CPR) including chest compressions, to virtually continuously determine the need for an electric shock to the patient undergoing CPR, regardless of the presence or absence of chest compressions.

BACKGROUND

For patients with cardiac arrest, application of uninterrupted chest compressions for creating artificial circulation is a critical factor for survival. At the same time, it is important to make an ECG diagnosis for such a patient approximately every two minutes and, if an electric shock is needed, to deliver an electric shock as soon as possible.

When a physician performs CPR, the ECG diagnosis for determining the need for an electric shock is performed by the physician visually checking an ECG. When a person other than a physician (including a nurse/a paramedic, and a well-meaning member of the public) performs CPR, the ECG diagnosis is performed according to an instruction by an automatic ECG diagnostic function built into an AED.

The presence of ventricular fibrillation (VF: ventricular fibrillation) and ventricular tachycardia (VT: ventricular tachycardia) with a heart rate of 150 bmp (180 bmp in some cases) or higher on a body surface ECG is typically considered to indicate the need for an electric shock.

However, in both cases of the diagnosis by a physician and the determination by the automatic diagnostic function, it is necessary to temporarily interrupt chest compressions to create a situation in which no noise contamination occurs on the ECG, because large noise appears on the ECG during chest compressions due to deformation of the thoracic cage or the like caused by the compressions.

Such interruption of chest compressions requires several seconds or more even when a physician skilled in CPR makes a visual ECG diagnosis, and 10 seconds or more when a person other than a physician skilled in CPR follows the automatic diagnosis of the AED. Many studies have shown that for every second of interruption of chest compressions associated with the ECG diagnosis, the survival rate of the patient decreases by 2.5 to 3%.

Therefore, various waveform determination methods have been proposed by many research institutes and AED manufacturers, with the aim of reducing the interruption duration of chest compressions required for the ECG diagnosis.

Noise filtering is a typical example of such a proposal. The noise filtering intends to reproduce a raw waveform uncontaminated with noise by removing fluctuations considered to be noise associated with chest compressions from the ECG by digital filtering (often based on frequency analysis using fast Fourier transform).

As this type of invention, Patent Literature 1 (National Publication of International Patent Application No. 2017-525410) describes a method (see claim 28) for distinguishing an original ECG derived from cardiac activity (described as "cardiac event" in Patent Literature 1) from noise in an ECG signal (ECG signal).

Additionally, Patent Literature 2 (National Publication of International Patent Application No. 2018-500092) describes an invention of an AED (see claim 1) for use during CPR (CPR), including an ECG analyzer operable to determine the need for an electric shock (described as "shockable cardiac rhythm" in Patent Literature 2) in the presence of noise from chest compressions (described as "CPR-related signal noise artifact" in Patent Literature 2).

The ECG analyzer of the invention described in Patent Literature 2 is operable to determine the shockable cardiac rhythm with a high diagnostic accuracy of sensitivity at greater than about 70% and a specificity (diagnostic accuracy) at greater than about 95% (claim 1), and in some cases under certain rules, the sensitivity can exceed 95% and the specificity can exceed 98% (paragraph 0042). However, in reality, ECG analyzers with a diagnostic accuracy of only 95-98% are never installed in AEDs, and further improvement in the diagnostic accuracy is still required.

In view of these circumstances, the present inventor proposed an electrocardiogram analysis system that digitally samples and transforms a body surface ECG signal into ECG discrete data, transforms the ECG discrete data into an ECG spectrogram, and outputs and reports a result of determining the need for an electric shock with respect to the ECG spectrogram by using a convolutional neural network (CNN). The proposed system succeeded in providing an electrocardiogram analysis system capable of virtually continuously determining the need for an electric shock to a patient undergoing CPR, with an accuracy of 99% or higher, regardless of whether chest compressions are being applied to the patient (Japanese Patent No. 6640939).

However, even though the accuracy of determining the need for an electric shock to the patient undergoing CPR is 99%, there remains a possibility of failure about once in 100 times. Thus, the present inventor continued to explore a way to further improve the diagnostic accuracy of the above electrocardiogram analysis system.

CITATION LIST

Patent Literature

[Patent Literature 1] National Publication of International Patent Application No. 2017-525410
[Patent Literature 2] National Publication of International Patent Application No. 2018-500092

SUMMARY

Technical Problem

An object of the present invention is to provide an electrocardiogram analysis system capable of determining the need for an electric shock to a patient undergoing CPR, with a higher accuracy than the above electrocardiogram analysis system.

Solution to Problem

To solve the above object, the invention according to claim 1 is an electrocardiogram analysis system for determining a need for an electric shock to a patient undergoing chest compressions, the electrocardiogram analysis system including:

ECG signal acquiring means connected to a plurality of electrodes that acquires a body surface ECG signal from the patient;

impedance signal acquiring means connected to a plurality of electrodes that acquires a transthoracic impedance signal from the patient;

ECG signal sampling means that digitally samples and transforms the body surface ECG signal into ECG discrete data;

impedance signal sampling means that digitally samples and transforms the transthoracic impedance signal into impedance discrete data;

ECG spectrogram transforming means that transforms the ECG discrete data into an ECG spectrogram;

impedance spectrogram transforming means that transforms the impedance discrete data into an impedance spectrogram;

a CNN that outputs a result of determining the need for an electric shock with respect to the ECG spectrogram and the impedance spectrogram input to the CNN; and electric shock indication reporting means that provides a report regarding the need for an electric shock to the patient according to the determination result output from the CNN, wherein the report includes a notification, and wherein the notification is a display indicating "needed" or "not needed" or a sound indicating "needed" or "not needed,"

the CNN is a priori provided with sample data including sample ECG spectrograms obtained by transforming sample body surface ECG signals acquired from a large number of subjects undergoing chest compressions, sample impedance spectrograms obtained by transforming sample transthoracic impedance signals acquired from the large number of subjects, and sample response data on the need for an electric shock with respect to the respective sample ECG spectrograms and the respective sample impedance spectrograms, and is optimized by self-learning the sample data, wherein the sample data is configured to be the same type of data as the ECG signal sampling means, the ECG spectrogram transforming means, the impedance signal sampling means and the impedance spectrogram transforming means, the ECG spectrogram transforming means is configured to perform short-time Fourier transform (STFT) by dividing the ECG discrete data within a determination window of prespecified duration into small segments each having a specific duration with a fixed time difference, the sample ECG spectrograms are ECG matrix data with a plurality of rows each obtained with the fixed time difference along a time axis, and a plurality of columns obtained along a frequency axis, the impedance spectrogram transforming means is configured to perform STFT by dividing the impedance discrete data within the determination window of prespecified duration into small segments each having the specific duration with the fixed time difference, and the sample impedance spectrograms are impedance matrix data with a plurality of rows each obtained with the fixed time difference along a time axis, and a plurality of columns obtained along a frequency axis.

To solve the above object, the invention according to claim 2 is the electrocardiogram analysis system of the invention according to claim 1, wherein the ECG signal sampling means includes means that samples the body surface ECG signal at a sampling frequency of 120 to 360 Hz and means that downsamples the body surface ECG signal at a sampling frequency of 40 to 80 Hz, and the impedance signal sampling means includes means that samples the transthoracic impedance signal at a sampling frequency of 60 to 360 Hz and means that downsamples the transthoracic impedance signal at a sampling frequency of 40 to 80 Hz.

To solve the above object, the invention according to claim 1 is the electrocardiogram analysis system of the invention, wherein the prespecified duration of determination window is 4 to 20 seconds, and the specific duration and the fixed time difference of the small segments are, respectively, 1 to 3 seconds and 100 to 200 milliseconds (hereinafter referred to as "ms").

Advantageous Effects of Invention

The electrocardiogram analysis system of the invention according to claim 1 digitally samples and transforms the body surface ECG signal and the transthoracic impedance signal acquired from the patient into the ECG discrete data and the impedance discrete data, respectively, and further transforms the ECG discrete data and the impedance discrete data into the ECG spectrogram and the impedance spectrogram, respectively.

The electrocardiogram analysis system includes the CNN that outputs the result of determining the need for an electric shock with respect to the ECG spectrogram and the impedance spectrogram input to the CNN, and the electric shock indication reporting means that provides the report regarding the need for an electric shock to the patient according to the determination result output from the CNN.

The CNN is a priori provided with the sample data including the sample ECG spectrograms obtained by transforming the sample body surface ECG signals acquired from the large number of subjects undergoing chest compressions, the sample impedance spectrograms obtained by transforming the sample transthoracic impedance signals acquired from the same subjects, and the sample response data on the need for an electric shock with respect to the respective sample ECG spectrograms and the respective sample impedance spectrograms, and is optimized by self learning the sample data, wherein the sample data is configured to be the same type of data as the ECG signal sampling means, the ECG spectrogram transforming means, the impedance signal sampling means and the impedance spectrogram transforming means.

The ECG spectrogram transforming means is configured to perform the STFT by dividing the ECG discrete data within the determination window of prespecified duration into the small segments each having the specific duration with the fixed time difference.

The sample ECG spectrograms are the ECG matrix data with the rows each obtained with the fixed time difference along the time axis, and the columns obtained along the frequency axis.

The impedance spectrogram transforming means is configured to perform the STFT by dividing the impedance discrete data within the determination window of prespecified duration into the small segments each having the specific duration with the fixed time difference.

The sample impedance spectrograms are the impedance matrix data with the rows each obtained with the fixed time difference along the time axis, and the columns obtained along the frequency axis. Therefore, the need for an electric shock to the patient undergoing CPR can be determined with an accuracy of 99.5% or higher by acquiring the body surface ECG signal and the transthoracic impedance signal, regardless of whether chest compressions are being applied to the patient.

In the electrocardiogram analysis system of the invention according to claim 2, in addition to the above effects provided by the invention according to claim 1, the ECG signal sampling means includes the means that samples the body surface ECG signal at the sampling frequency of 120 to 360 Hz and the means that downsamples the body surface ECG signal at the sampling frequency of 40 to 80 Hz, and the impedance signal sampling means includes the means that samples the transthoracic impedance signal at the sampling frequency of 60 to 360 Hz and the means that downsamples the transthoracic impedance signal at the sampling frequency of 40 to 80 Hz. Therefore, a time required for computation can be reduced without impairing information contained in an ECG waveform and an impedance waveform.

In the electrocardiogram analysis system of the invention according to claim 1, in addition to the above effects provided by the electrocardiogram analysis system of the invention, the prespecified duration of determination window is 4 to 20 seconds, and the specific duration and the fixed time difference of the small segments are, respectively, 1 to 3 seconds and 100 to 200 ms. The CNN performs determination for the body surface ECG signal and the transthoracic impedance signal.

A series of processes required for such determination can be repeated approximately every 100 ms using an ordinary computer, so that the need for an electric shock to the patient undergoing chest compressions for CPR can be determined with a high accuracy virtually continuously/in real time, regardless of whether chest compressions are being applied.

BRIEF DESCRIPTION OF DRAWINGS

FIG. 4 is a view illustrating an example of an ECG spectrogram and an impedance spectrogram.

DESCRIPTION OF EMBODIMENTS

Hereinafter, an embodiment of the present invention will be described using an example.

Example

Figure 1:
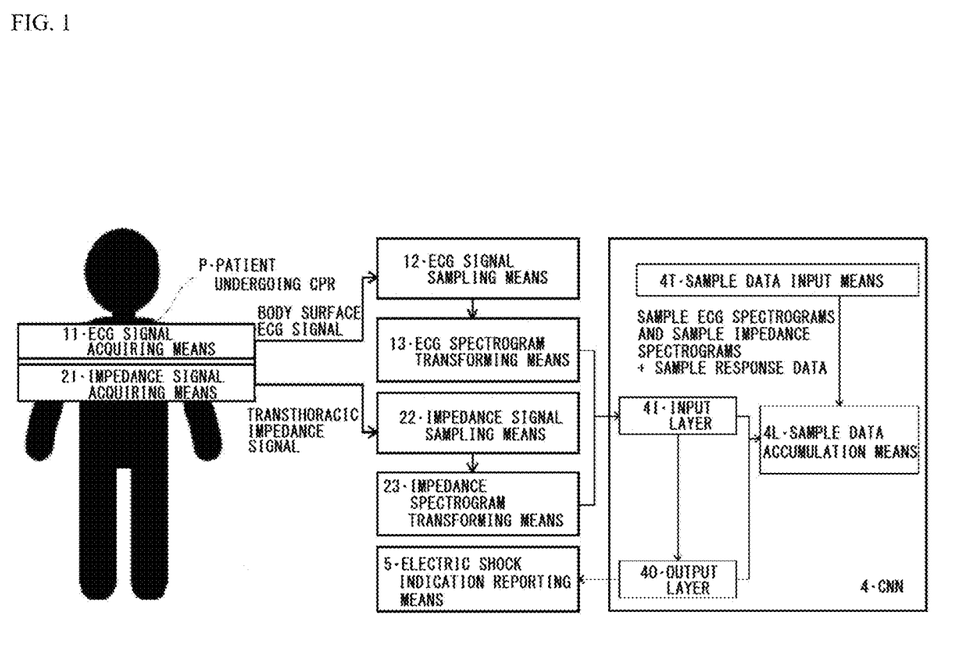
FIG. 1 is a block diagram of an electrocardiogram analysis system of an example.

FIG. 1 is a block diagram of an electrocardiogram analysis system according to the example.

As illustrated in FIG. 1, the electrocardiogram analysis system according to the example includes ECG signal acquiring means 11 and impedance signal acquiring means 21 that are provided in an AED, a defibrillator, or an electrocardiograph, etc. attached to a patient P undergoing CPR, ECG signal sampling means 12 that digitally samples and transforms a body surface ECG signal acquired by the ECG signal acquiring means 11 into ECG discrete data, impedance signal sampling means 22 that digitally samples and transforms a transthoracic impedance signal acquired by the impedance signal acquiring means 21 into impedance discrete data, ECG spectrogram transforming means 13 that transforms the ECG discrete data received from the ECG signal sampling means 12 into an ECG spectrogram, impedance spectrogram transforming means 23 that transforms the impedance discrete data received from the impedance signal sampling means 22 into an impedance spectrogram, a CNN (CNN: convolutional neural network) 4, and electric shock indication reporting means 5 that provides a report regarding the need for an electric shock to the patient P based on a determination result output from the CNN 4.

The body surface ECG signal acquired by the ECG signal acquiring means 11 is an analog signal recorded as an electric potential difference between two electrodes affixed to the body surface of the patient P. The ECG signal sampling means 12 samples the analog signal for about 12 seconds, which is a window of ECG determination, at a sampling frequency of 120 to 360 Hz to transform it into discrete data.

The transthoracic impedance signal acquired by the impedance signal acquiring means 21 is an analog signal recorded as an impedance between two electrodes affixed to the body surface of the patient P. The impedance signal sampling means 22 samples the analog signal for about 12 seconds, which is the same duration as the ECG determination window, at a sampling frequency of 60 to 360 Hz to transform it into discrete data.

Figure 2:
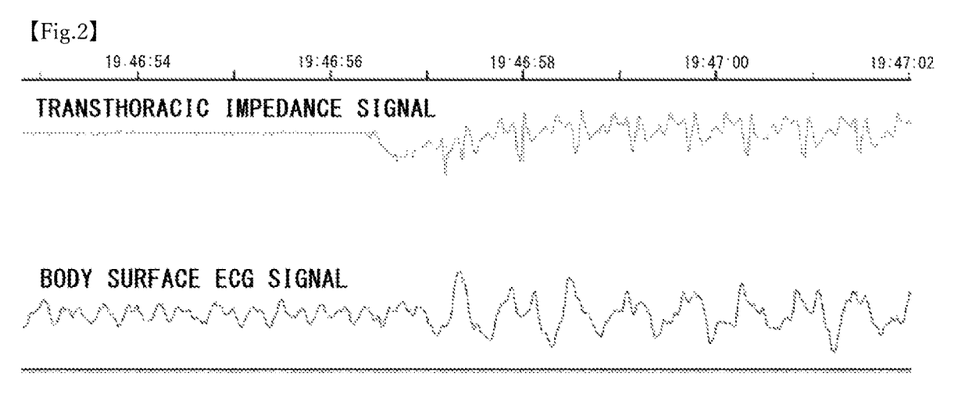
FIG. 2 is view illustrating an example of a body surface ECG signal and a transthoracic impedance signal.

FIG. 2 is a view illustrating an example of the body surface ECG signal and the transthoracic impedance signal. The body surface ECG signal is not affected by noise (artifact) associated with chest compressions before chest compressions (before 19:46:57), but is contaminated with noise associated with chest compressions during chest compressions (from 19:46:57). The transthoracic impedance signal fluctuates little during interruption of chest compressions in which the patient P stops breathing, and fluctuates relatively regularly during chest compressions in which chest compressions are regularly applied to the patient P, because the impedance changes according to expansion and contraction of the thoracic cage of the patient P.

Here, the analog signal as the determination window may partly or wholly include noise (artifact) associated with chest compressions, or include no noise.

The function of transforming the body surface ECG signal into such discrete data and outputting the data is provided in commercially available AEDs. The function of transforming the transthoracic impedance signal into similar discrete data and outputting the data can also be easily added to the commercially available AEDs.

The ECG signal sampling means 12 in this example further downsamples the discrete data of 120 to 360 Hz obtained by sampling the body surface ECG signal at a new sampling frequency of about 60 Hz.

Also, the impedance signal sampling means 22 in this example further downsamples the discrete data of 60 to 360 Hz obtained by sampling the transthoracic impedance signal at a new sampling frequency of about 60 Hz.

The reason for such downsampling is that the body surface ECG signal and the transthoracic impedance signal include few frequency components of 30 Hz or higher, and frequency components of 30 Hz or higher are often removed by low frequency pass filters in common AEDs.

Therefore, information contained in the body surface ECG signal and the transthoracic impedance signal is not impaired by using the downsampled ECG discrete data. The downsampling also reduces the amount of data, thereby reducing a time required for the subsequent computation.

When receiving the ECG discrete data from the ECG signal sampling means 12, the ECG spectrogram transforming means 13 transforms the ECG discrete data into an ECG spectrogram by STFT (STFT: short-time Fourier transform) and outputs the ECG spectrogram.

Also, when receiving the impedance discrete data from the impedance signal sampling means 22, the impedance spectrogram transforming means 23 transforms the impedance discrete data into an impedance spectrogram by STFT (STFT: short-time Fourier transform) and outputs the impedance spectrogram.

Figure 3:
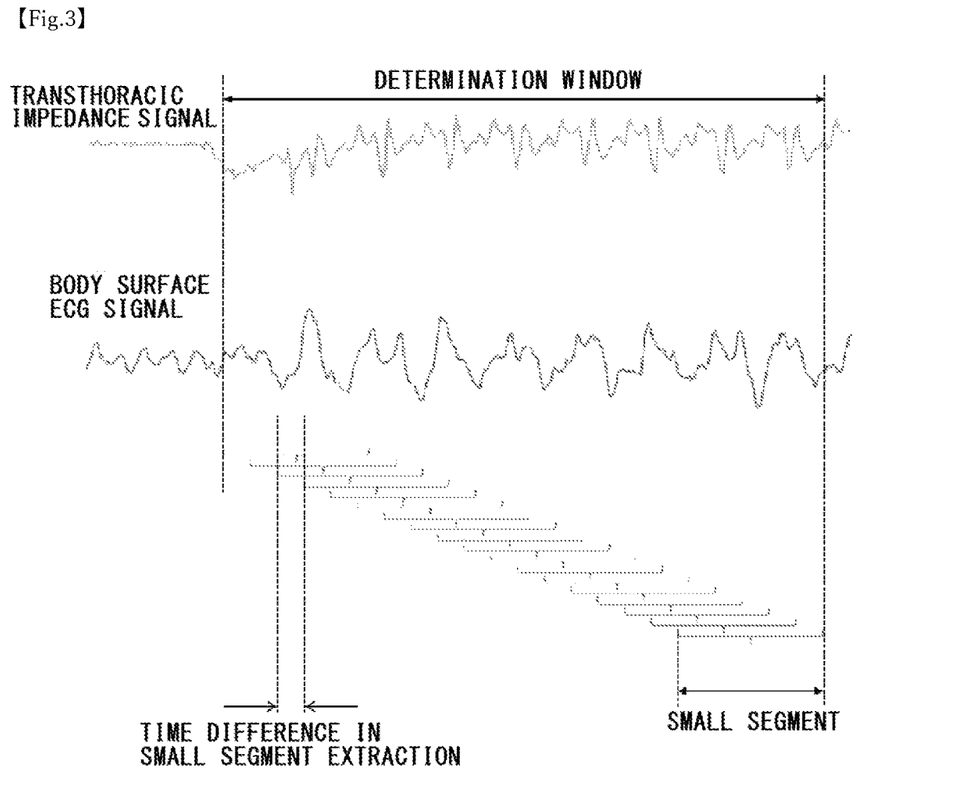
FIG. 3 is a view for explaining a method of processing ECG discrete data and transthoracic impedance discrete data.

In this example, as illustrated in FIG. 3, a window of about 12 seconds is extracted from the received ECG discrete data and the received impedance discrete data and used as a determination window. The ECG discrete data and the impedance discrete data within the determination window were transformed into the ECG spectrogram and the impedance spectrogram, respectively, by division-extracting small segment data each of about 2 seconds (which can overlap each other), from the determination window with a time difference of 128 ms, and performing the STFT on each small segment data.

When the data length of the determination window, the time difference in the data extraction, and the data length of the small segment are set as described above, the ECG spectrogram and the impedance spectrogram are each generated into matrix data with 80 rows along a time axis and 64 columns along a frequency axis as illustrated in FIG. 4.

For column components along the frequency axis, all of them may be used, or some of low-frequency and high-frequency components may be excluded.

The number of rows along the time axis direction increases when the determination window is lengthened or the time difference in the data extraction is shortened. The number of columns along the frequency axis increases when the small segment is lengthened.

The CNN 4 is composed of an input layer 4I, an output layer 4O, sample data accumulation means 4L, sample data input means 4T that inputs a large number of sample data to the sample data accumulation means 4L, and a plurality of convolution layers, a pooling layer, a BN layer (Batch-normalization layer), a drop-out layer (drop-out layer), a fully connected layer, and others not illustrated.

Several units connected in series, one of which is typically composed of a combination of two to three convolution layers and one pooling layer, are often further combined with two to four fully connected layers.

The sample data includes sample ECG spectrograms and sample impedance spectrograms acquired from subjects undergoing chest compressions, and sample response data on the need for an electric shock with respect to the respective sample ECG spectrograms and the respective sample impedance spectrograms.

In the present invention, it is necessary to accumulate a large number of sample data. The body surface ECG signals and the transthoracic impedance signals can be easily acquired from the subjects during chest compressions as well as during interruption of chest compressions for determining the need for an electric shock. Thus, based on the body surface ECG signals and the transthoracic impedance signals in both of the states, it is easy to acquire the sample ECG spectrograms, the sample impedance spectrograms, and the sample response data for the subjects.

While the BN layer and the drop-out layer do not necessarily have to be provided, inserting them into the neural network can be expected to improve the overall performance of the neural network.

The input layer 4I is provided with the 80-row, 64-column matrix data described above (a total of two layers in which one ECG spectrogram layer and one impedance spectrogram layer are superimposed).

In addition to a typical 2-dimensional array of signal strengths (power or magnitude), the ECG spectrogram and the impedance spectrogram can be regarded as a two-layer, 2-dimensional array of real and imaginary parts of complex numbers obtained as the coefficients of a Fourier series, with the purpose of treating the respective coefficients as independent information (complex-type spectrogram). In this case, not only the signal strengths but also information about a phase difference between the real and imaginary parts is retained, which slightly improves the diagnostic accuracy but prolongs a time required for the computation for determination. Alternatively, for the same purpose, the signal strengths and phase angles obtained from the complex number-type spectrogram may be used as a two-layer, 2-dimensional array, individually as independent information (signal strength/phase angle spectrogram).

The output layer 4O outputs vector (1-dimensional matrix) data representing a result of determining indication for an electric shock. The number of elements thereof is the number of categories classifying the body surface ECG signal and the transthoracic impedance signal.

For example, if the body surface ECG signal and the transthoracic impedance signal are classified into two categories: "with indication for an electric shock" and "without indication for an electric shock", the number of elements is 2. If the body surface ECG signal and the transthoracic impedance signal are classified into three categories: "with indication for an electric shock", "asystole", and "pulseless electrical activity", the number of elements is 3.

The CNN 4 is optimized by self-learning the large number of sample data (data usually acquired from tens of thousands to millions of subjects) that are accumulated in the sample data accumulation means 4L. By using parameters optimized by a sufficient number (usually hundreds of thousands or more) of sample data, a diagnostic accuracy of 99.5% or higher can be obtained.

As the number of accumulated sample data increases, the diagnostic accuracy is enhanced. Thus, in this example, the ECG spectrogram, the impedance spectrogram, and the electric shock indication data (with indication) obtained when the patient undergoing CPR has been resuscitated by an electric shock can be accumulated as the sample data in the sample data accumulation means 4L.

The electric shock indication reporting means 5 reports that an electric shock to the patient P is needed when the output of the CNN 4 represents "with indication for an electric shock", and reports that no electric shock to the patient P is needed when this output represents "without indication for an electric shock" (the number of elements: 2), or "asystole" or "pulseless electrical activity" (the number of elements: 3).

Examples thereof include a method of displaying an ECG in red in a case of "with indication for an electric shock" and in green in a case of "without indication for an electric shock" or the like when displaying an ECG on a screen, a method of displaying "needed" in a case of "with indication for an electric shock" and "not need" in a case of "without indication for an electric shock" or the like when displaying whether an electric shock is needed on a screen, and a method of producing a sound "needed" in a case of "with indication for an electric shock" and "not needed" in a case of "without indication for an electric shock" or the like when providing a report using a speech sound.

Figure 5:
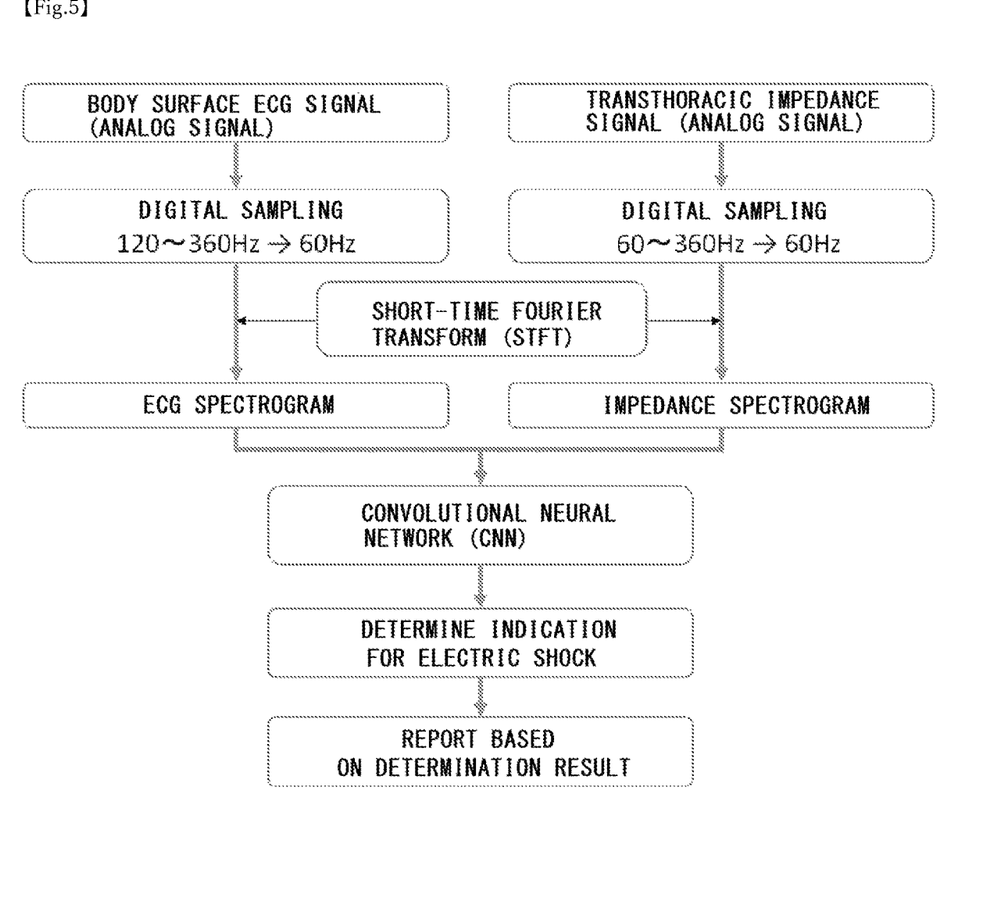
FIG. 5 is a flowchart illustrating an algorithm of the electrocardiogram analysis system.

FIG. 5 is a flowchart of the method (algorithm) described above, in which the following procedure is used to determine and report whether an electric shock is needed.

The procedure (2-1) (3-1) and the procedure (2-2) (3-2) can be performed in parallel.

(1) The body surface ECG signal and the transthoracic impedance signal (analog signals) are acquired.

(2-1) The analog signal within the determination window (about 12 seconds) is digitally sampled.

The analog signal is sampled at the sampling frequency of 120 to 360 Hz, and is further downsampled at the sampling frequency of about 60 Hz to be transformed into the ECG discrete data.

(3-1) The ECG discrete data is transformed into the spectrogram by the STFT (STFT), and the ECG spectrogram is output.

(2-2) The analog signal within the determination window (about 12 seconds) is digitally sampled.

The analog signal is sampled at the sampling frequency of 60 to 360 Hz, and is further downsampled at the sampling frequency of about 60 Hz to be transformed into the impedance discrete data.

(3-2) The impedance discrete data is transformed into the spectrogram by the STFT (STFT), and the impedance spectrogram is output.

(4) The ECG spectrogram and the impedance spectrogram are sent to the CNN.

(5) The CNN determines the indication for an electric shock.

(6) The report based on the determination result (the report whether an electric shock is needed) is provided.

Figure 6:
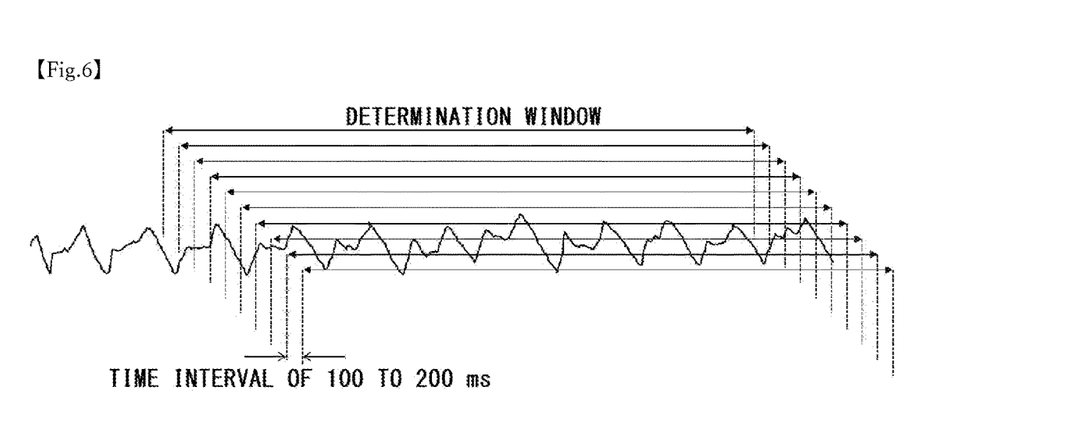
FIG. 6 is a view for explaining updating of a determination window.

(7) After that, the procedure (2-1) (3-1), the procedure (2-2) (3-2), and the procedure (4) to (6) are repeated at time intervals of 100 to 200 ms (depending on the performance of a computer performing the determination), for new determination windows (about 12 seconds) as illustrated in FIG. 6, so that virtually continuous/real-time determination and report are achieved.

Modifications of the example are listed below:

(1) In the example, the data obtained by digitally sampling the body surface ECG signal at the sampling frequency of 120 to 360 Hz and the data obtained by digitally sampling the transthoracic impedance signal at the sampling frequency of 60 to 360 Hz are each downsampled at the sampling frequency of about 60 Hz to be transformed into the ECG discrete data and the impedance discrete data. However, the downsampling does not have to be performed.

The body surface ECG signal can also be directly sampled at a sampling frequency of about 60 Hz to be transformed into the ECG discrete data.

Furthermore, the sampling frequency in the downsampling is not limited to 60 Hz, but can be selected in a range of 40 to 80 Hz.

(2) In the example, the ECG discrete data and the impedance discrete data of about 12 seconds are used as the determination window, and the small segment data of about 2 seconds are extracted from the data, with a time difference of 128 ms from each other. The obtained data are transformed into the ECG spectrogram and the impedance spectrogram by performing the STFT. However, the time difference in the small segment extraction can be selected in a range of 32 to 256 ms instead of 128 ms, and the small segment data can be selected in a range of 0.3 to 4 seconds instead of 2 seconds.

Note that lengthening the data length of the small segment reduces the time resolution of the spectrogram, but increases the number of data available for the Fourier transform, thereby improving the frequency resolution. Conversely, shortening the data length of the small segment improves the time resolution of the spectrogram, but reduces the frequency resolution.

Additionally, lengthening the determination window improves the diagnostic accuracy, but increases the computational load of the CNN, which prolongs the computational time, and also prolongs a time until a change in the body surface ECG signal or the transthoracic impedance signal, if any, is detected (decrease in time responsiveness). For example, if the determination window is 12 seconds, and the body surface ECG signal is changed from a shock-indicated waveform to a non-indicated waveform, it takes (theoretically) about 6 seconds for the change to be reflected in the determination result. However, since the present invention allows for virtually continuous determination, such time delays do not cause any practical problem. Conversely, shortening the determination window improves the time responsiveness, but reduces the diagnostic accuracy.

The data length of the determination window, the data length of the small segment, and the time difference in the small segment extraction are preferably selected from a range of 4 to 20 seconds, 1 to 3 seconds, and 100 to 200 ms, respectively, and more preferably selected from a range of 8 to 15 seconds, 1.5 to 2.5 seconds, and 100 to 150 ms, respectively.

(3) In the example, the ECG discrete data and the impedance discrete data are individually transformed into the spectrograms by the STFT (STFT), and the ECG spectrogram and the impedance spectrogram are output. However, any transforming method can be used that obtains spectral intensity from the ECG discrete data and the impedance discrete data.

REFERENCE SIGNS LIST

11 ECG SIGNAL ACQUIRING MEANS
12 ECG SIGNAL SAMPLING MEANS
13 ECG SPECTROGRAM TRANSFORMING MEANS
21 IMPEDANCE SIGNAL ACQUIRING MEANS
22 IMPEDANCE SIGNAL SAMPLING MEANS
23 IMPEDANCE SPECTROGRAM TRANSFORMING MEANS
4 CONVOLUTIONAL NEURAL NETWORK
4I INPUT LAYER
4L SAMPLE DATA ACCUMULATION MEANS
4O OUTPUT LAYER
4T SAMPLE DATA INPUT MEANS
5 ELECTRIC SHOCK INDICATION REPORTING MEANS
P PATIENT UNDERGOING CPR

What is claimed is:

1. An electrocardiogram analysis system for determining a need for an electric shock to a patient undergoing chest compressions, the electrocardiogram analysis system comprising:

ECG signal acquiring means connected to a first plurality of electrodes that acquires a body surface ECG signal from the patient;

impedance signal acquiring means connected to a second plurality of electrodes that acquires a transthoracic impedance signal from the patient;

ECG signal sampling means that digitally samples and transforms the body surface ECG signal into ECG discrete data;

impedance signal sampling means that digitally samples and transforms the transthoracic impedance signal into impedance discrete data;

ECG spectrogram transforming means that transforms the ECG discrete data into an ECG spectrogram;

impedance spectrogram transforming means that transforms the impedance discrete data into an impedance spectrogram;

a CNN that outputs a result of determining the need for an electric shock with respect to the ECG spectrogram and the impedance spectrogram input to the CNN; and electric shock indication reporting means that provides a report regarding the need for an electric shock to the patient according to the determination result output from the CNN, wherein the report includes a notification, and the notification is a displayed indication of "needed" or "not needed" or a sound indicating "needed" or "not needed,"

wherein the CNN is a priori provided with sample data including sample ECG spectrograms obtained by transforming sample body surface ECG signals acquired from a large number of subjects undergoing chest compressions, sample impedance spectrograms obtained by transforming sample transthoracic impedance signals acquired from the large number of subjects, and sample response data on the need for an electric shock with respect to the respective sample ECG spectrograms and the respective sample impedance spectrograms, and is optimized by self-learning the sample data, wherein the sample data is configured to be the same type of data as the ECG signal sampling means, the ECG spectrogram transforming means, the impedance signal sampling means, and the impedance spectrogram transforming means, wherein the ECG spectrogram transforming means is configured to perform short-time Fourier transform (STFT) by dividing the ECG discrete data within a determination window of prespecified duration into small segments each having a specific duration with a fixed time difference, wherein the sample ECG spectrograms are ECG matrix data with a plurality of rows each obtained with the fixed time difference along a time axis, and a plurality of columns obtained along a frequency axis, wherein the impedance spectrogram transforming means is configured to perform STFT by dividing the impedance discrete data within the determination window of prespecified duration into small segments each having the specific duration with the fixed time difference, wherein the sample impedance spectrograms are impedance matrix data with a plurality of rows each obtained with the fixed time difference along a time axis, and a plurality of columns obtained along a frequency axis, wherein the prespecified duration of determination window is 4 to 20 seconds, and wherein the specific duration and the fixed time difference of the small segments are, respectively, 1 to 3 seconds and 100 to 200 ms.

2. The electrocardiogram analysis system according to claim 1, wherein the ECG signal sampling means includes means that samples the body surface ECG signal at a sampling frequency of 120 to 360 Hz, and means that downsamples the body surface ECG signal at a sampling frequency of 40 to 80 Hz, and the impedance signal sampling means includes means that samples the transthoracic impedance signal at a sampling frequency of 60 to 360 Hz and means that downsamples the transthoracic impedance signal at a sampling frequency of 40 to 80 Hz.

* * * * *